(12) United States Patent
Gennesseaux

(10) Patent No.: US 10,281,003 B2
(45) Date of Patent: May 7, 2019

(54) FLYWHEEL INTENDED FOR ENERGY STORAGE

(71) Applicant: ENERGIESTRO, Chateaudun (FR)

(72) Inventor: Andre Gennesseaux, Chateaudun (FR)

(73) Assignee: ENERGIESTRO, Chateaudun (FR)

( * ) Notice: Subject to any disclaimer, the term of this patent is extended or adjusted under 35 U.S.C. 154(b) by 50 days.

(21) Appl. No.: 15/520,970

(22) PCT Filed: Oct. 23, 2015

(86) PCT No.: PCT/FR2015/052850
§ 371 (c)(1),
(2) Date: Apr. 21, 2017

(87) PCT Pub. No.: WO2016/066933
PCT Pub. Date: May 6, 2016

(65) Prior Publication Data
US 2017/0343076 A1    Nov. 30, 2017

(30) Foreign Application Priority Data
Oct. 28, 2014  (FR) ...................................... 14 02430

(51) Int. Cl.
*F16F 15/30* (2006.01)
*B29C 70/32* (2006.01)
(Continued)

(52) U.S. Cl.
CPC .............. *F16F 15/30* (2013.01); *B29C 70/32* (2013.01); *H02K 7/025* (2013.01); *B29L 2031/32* (2013.01); *Y02E 60/16* (2013.01)

(58) Field of Classification Search
CPC .......... F16F 15/30; F16F 15/00; F16F 15/305; B29C 70/32; H02K 7/025
See application file for complete search history.

(56) References Cited

U.S. PATENT DOCUMENTS 3,977,273 A * 8/1976 Ernst ...................... B64G 1/283
74/572.21
4,817,453 A * 4/1989 Breslich, Jr. ............ B04B 7/085
494/16
(Continued)

FOREIGN PATENT DOCUMENTS

FR      2 944 836 A1    10/2010

OTHER PUBLICATIONS

International Search Report, dated Feb. 29, 2016, from corresponding PCT application.

*Primary Examiner* — Thomas C Diaz
(74) *Attorney, Agent, or Firm* — Young & Thompson

(57) ABSTRACT

Disclosed is a flywheel intended for energy storage, including a cylindrical mass body including a main material with compression resistance of at least 25 MPa, such as concrete, the body being surrounded on at least one portion of the outer surface thereof with fibers, the material that makes up the fibers having a tensile strength of at least 100 Mpa. The tension of winding the fibers around the body leads to the compression of the main material, and the tension applied to the fibers is such that the stress exerted on the material of the mass body is at least equal to half of the maximum acceptable stress, the maximum stress being lower than the compression yield strength of the material that makes up the mass body, the material of the latter thus being pre-stressed.

20 Claims, 2 Drawing Sheets

(51) Int. Cl.
*H02K 7/02* (2006.01)
*B29L 31/32* (2006.01)

(56) References Cited

U.S. PATENT DOCUMENTS

2011/0100156 A1    5/2011   Jung et al.
2012/0060644 A1    3/2012   Morgan et al.

\* cited by examiner

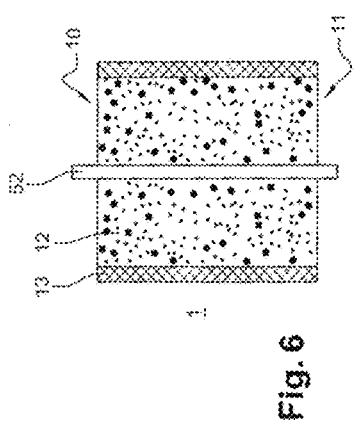
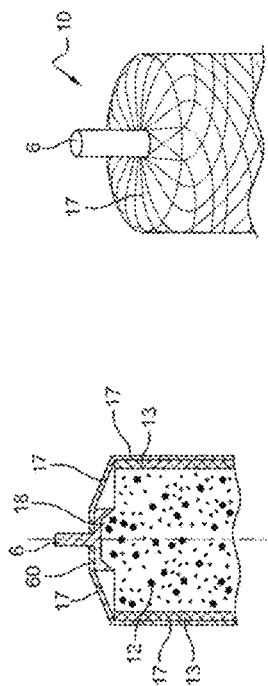
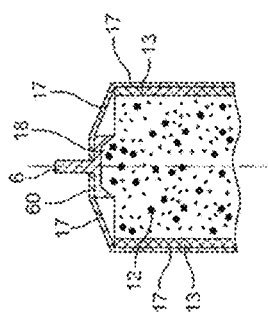
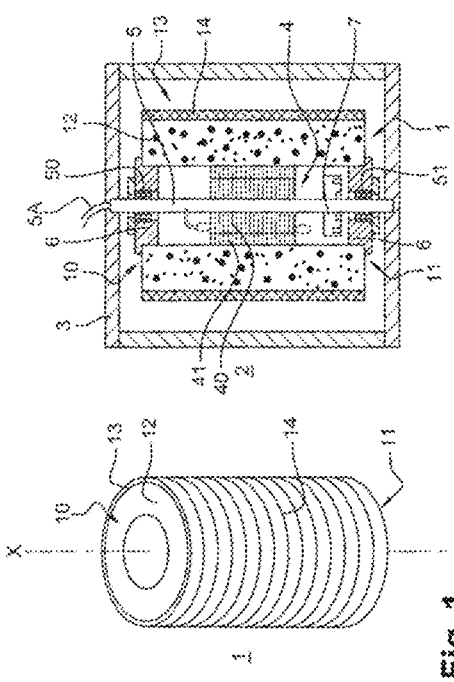
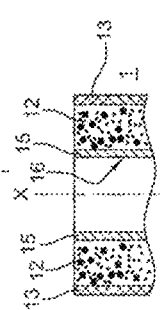
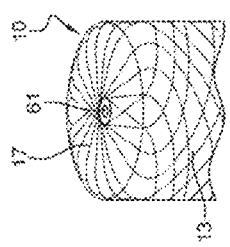
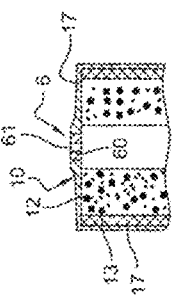

FLYWHEEL INTENDED FOR ENERGY STORAGE

The invention relates to a flywheel intended for energy storage and its method of manufacture.

The invention shall be more particularly described with regards to a flywheel manufactured according to the invention with a concrete base, without however being limited to this. The main material that makes up the flywheel will be chosen so as to be similar to a material of the concrete type in such a way as to have a low cost price and a compression resistance of at least 25 MPa.

BACKGROUND OF THE INVENTION

In a known manner, a flywheel via its mechanical rotation is used in a device for the temporary storage of energy that has an application in many fields, such as in the storage and the smoothing of intermittent renewable energies of the wind, solar type, the supplying of isolated sites with electricity, the restitution of energy for the braking of vehicles, etc.

With regards to other devices for the storage of electrical energy such as electric batteries, the flywheel has the main advantage of a practically unlimited service life, implying over time a lower cost of energy storage than with the other devices.

A flywheel comprises a solid body, usually referred to by the term "mass", linked to the rotating shaft of an electric motor. The electric motor drives the flywheel in rotation which can reach very high rotation speeds in a few minutes, even in a few seconds. After the stopping of the supply of the electric motor, the mass of the flywheel having stored kinetic energy continues to rotate and can then return mechanical energy which is in turn converted into electrical energy by using the motor as an electric generator.

The centrifugal force that the mass of the flywheel is subjected to results in very high traction stress for the material that comprises the mass. As such it is necessary to choose a manufacturing material that exhibits a high resistance to traction, in particular resistant to at least 100 MPa.

Today, the mass of a flywheel is manufactured most often from steel and for a few years now from carbon fibres.

However, due to its high cost price, in particular due to the material that comprises it, the flywheel is often set aside in order favour other types of energy storage devices such as electric batteries.

SUMMARY OF THE INVENTION

The invention therefore has for purpose to provide a flywheel with a cost price less than that of existing flywheels, while still being as resistant and with the same performance.

According to the invention, the flywheel intended for the storage of energy, comprising a cylindrical mass body comprising a main material that has a compression resistance of at least 25 MPa, such as concrete, said body being surrounded on at least one portion of the outer surface thereof with fibres, the material that makes up the fibres having a tensile strength of at least 100 MPa, wherein the tension of winding the fibres around the body leads to the compression of said main material, and in that the tension applied to the fibres is such that the stress exerted on the material of the mass body is at least equal to half of the maximum acceptable stress, said maximum stress being lower than the compression yield strength of the material that makes up the mass body, the material of the latter thus being pre-stressed.

As such, the mass of the flywheel of the invention is made of a main material, such as concrete, which very advantageously supports the compression, and is much less expensive than the steel or carbon. Due to the tension that was imposed upon the fibres during the winding around the mass material, the fibres in traction impart a very high compression of the mass material. The mass material is pre-stressed.

Concrete is however a material that in no way is intended to be used for a flywheel intended for energy storage, as it has a tensile strength that is practically zero. By combining with the concrete fibres wound under tension, despite the inherent shortcoming of the concrete in terms of its relatively low tensile strength, the flywheel of the invention unexpectedly exhibits a high property of tensile strength, even for very high rotation speeds.

Surprisingly, the fibres associated with the outer surface of the mass made of concrete, lead to pre-stressing the concrete sufficiently, in such a way as to generate an appropriate compression that will oppose the forces of traction that the flywheel will undergo during its rotation. The assembly of concrete and outer covering of the concrete with fibres under tension, advantageously leads to a structure that is able to withstand the forces of traction that a flywheel intended for storing energy will be subjected to.

Such a flywheel structure makes it possible to reach high rotation speeds well below the risk of rupture of the main material that makes it up, allowing for the storage of a large quantity of energy.

The tension applied to the fibres during the winding is such that the stress exerted in the material of the mass is at least equal to half of the maximum acceptable stress, with this maximum stress being less than the compression yield strength of the material that makes up the mass.

This yield strength of course depends on the material.

Concrete has a compression yield strength from 25 to 100 MPa, and even more for fibre-reinforced concretes.

The compression yield strength corresponds to the value for which the material that makes up the flywheel reaches rupture.

The maximum acceptable stress means the maximum stress that is not to be exceeded in order to reach the scheduled service life, corresponding to a minimum number of operating cycles. The maximum acceptable stress depends on many factors, such as the fatigue of the material, the period of the cycles, the duration and number of them, etc.

The maximum acceptable stress is always less than the compression yield strength.

For example, for a concrete that has a compression yield strength of 200 MPa, the maximum acceptable stress in order to reach 10,000 cycles is about 120 MPa, and the compressive stress due to the tension of winding the fibres will be of at least 60 MPa.

It will more preferably be ensured that a concrete that has a high compression yield strength is used, and consequently that a concrete that is sufficiently loaded with cement is used.

The thickness of the main material will be much greater than the thickness of the enclosure made of fibres, with the latter being however suited to provide the appropriate stress.

In particular, the ratio $e/D$ between the thickness $e$ of the enclosure, and D, the diameter of the cylindrical body including the thicknesses of the main material and of said enclosure, is greater than $1/100$.

The main portion of the body (the mass of the flywheel) made for example of concrete, can be comprised solely of concrete as such, or comprise fibres, such as fiber-glass or even of metal.

Concrete as a main material that forms the mass of the flywheel is advantageously inexpensive and supports the compression. However, the invention applies to any material other than steel and carbon fibres, and which has good compression resistance of at least 25 MPa, preferably of at least 40 MPa, even greater than 80 MPa, while still having a low cost price, in particular a cost less than € 1/kg. To date, only concrete has these characteristics.

Advantageously, the fibres form an enclosure under tension which covers at least the outside cylindrical surface of the body, and possibly also the two end bases of the cylindrical body.

The fibres are preferably glass fibres, possibly combined with polymeric material, for example made of polyester or epoxy, forming a coating for the fibres. The polymeric material is preferably deposited after the filament winding on and between the fibres.

Glass fibres have the advantage of being light and will make it possible to optimise the rotation speed of the flywheel.

Alternatively, the fibres could be made of carbon or of steel.

The material that makes up the fibres has a high tensile strength, of at least 100 MPa.

The material that makes up the fibres advantageously has a Young's modulus close to that of the main material that makes up the body (the concrete), or in particular less than 100 GPa so that the fibres are deformed concomitantly with the concrete during the rotation of the flywheel.

The material that makes up the fibres has a low density, in particular less than 4, in order to ensure, up to high speeds of rotation, its function of compressing the body of the flywheel.

In an alternative embodiment, the body of the flywheel comprises an interface layer arranged between the concrete and the fibres outside of the body.

The fibres when they are made of glass are for example made of E-glass, a glass which has the advantage of being economic in terms of costs. In case of the use of E-glass, it is preferred to arrange an interface layer between the concrete and the E-glass fibres, with this interface layer being for example made of fibres, in particular a glass separate from the E-glass. Alternatively, the interface layer could be made of another material such as a coat of paint.

Preferably, for reasons of cost, carbon fibres as fibres are not used.

The fibres are long fibres and come from one or several threads wound in tension around the body made of the main material.

In an embodiment, the body is cylindrical and hollow and comprises an additional material that covers the inner wall of the cylindrical body, in particular this material is made of steel. This additional material is for example from a duct or cylinder made of steel around which the main material has been moulded.

The body of the flywheel is cylindrical and the fibres cover the entire outer cylindrical surface and possibly the two end bases of the cylindrical body.

Advantageously, the fibres are wound on the cylindrical surface according to a direction tangent to the body, creating an angle with respect to the longitudinal axis of the body (i.e. in a helical fashion), in particular an angle between 10 and 90°, preferably according to an angle of or close to 90° with respect to the longitudinal axis of the body.

The winding comprises several layers in such a way as to provide a certain thickness to the enclosure. The layers can include windings with an angle of about 90°, then windings with a separate angle, for example 45°. In particular, when the two end bases are covered, the filament enclosure comprises a thickness of fibres according to a winding of about 90° on the cylindrical surface, and an additional thickness according to a winding of 45° covering the cylindrical surface and the end bases.

According to another characteristic, the body of the flywheel is cylindrical and comprises a central bore extending along the longitudinal axis of the cylindrical body. For the fastening of the flywheel for the purposes of the rotation thereof in usage position, the flywheel comprises two means suited for fastening and centring, such as hubs, which are made rigid with the central bore at the two respective end bases of the cylindrical body.

In an alternative embodiment, the body of the flywheel is cylindrical and solid and comprises a central shaft integrated to said body, with the shaft dedicated to the fastening of the flywheel for the usage thereof.

In yet another alternative, the body of the flywheel is cylindrical and solid and homogeneous, and comprises on each distal end base a means of fastening intended to the mounting of the flywheel and to its centring for the purposes of the usage thereof. The means is arranged at the centre of the end base of the cylindrical body. The whole body is solid without an internal cavity. Each one of the end bases comprises for example a central boss intended to receive the means for fastening the flywheel for the usage thereof. Each means of fastening is for example comprised of a hub or of a shaft.

The means for fastening has a base that cooperates with the body of the flywheel, with the fibres being arranged on the distal bases of the cylindrical body in order to cover the main material and surround the base of the means of fastening, making them integral with the body of the flywheel. The association of said means can in addition be obtained by gluing or by narrow engagement and adjusted into the body of the flywheel when it is hollow or over a protruding portion of the body of the flywheel (central boss) when the flywheel is solid.

The invention also relates to a method for manufacturing the flywheel of the invention.

The method comprises a step of manufacturing the body of the flywheel by moulding of the main material, then, after hardening of said material, a step of filament winding under tension of fibres, possibly followed by a step of impregnating the fibres with a polymeric resin.

When a means intended for the fastening and the rotation is integrated to the body of the flywheel, the means comprises a base intended to be made integral with said body, the method comprises a step prior to the winding, of positioning the end bases of the body of the flywheel of the bases of the parts, with the winding that follows this step being carried out on the entire cylindrical body made of main material, including on the end bases of said body, and surrounds the base of each part.

As such, the flywheel can be used in a system/device for energy storage. The energy storage device comprises a motor that can be reversed as a generator and housed in the enclosure, characterised in that it comprises the flywheel of the invention, with the flywheel being associated with the motor, driven by the motor and guided in rotation by journal bearings.

In the rest of the description, the term "outer" relating to the body of the flywheel, means the parts facing the exterior environment of the flywheel, i.e. the parts that will be arranged opposite the shaft of the motor and facing the protective enclosure in the framework of a normal installation of the flywheel.

BRIEF DESCRIPTION OF THE DRAWINGS

This invention is now described using examples solely for the purposes of illustration and in no way limiting the scope of the invention, and using the attached illustrations, wherein:

FIG. 1 shows a perspective view of an embodiment of the flywheel according to the invention, with the flywheel being hollow;

FIG. 2 shows a longitudinal cross-section view of an energy storage device comprising the flywheel of FIG. 1;

FIG. 3 is a partial cross-section view of an alternative embodiment of the flywheel of FIG. 1;

FIG. 4 is a partial longitudinal cross-section view of another alternative embodiment of the flywheel of FIG. 1;

FIG. 5 is a perspective view of the flywheel of FIG. 4;

FIG. 6 is a longitudinal cross-section view of another embodiment of the flywheel, with the flywheel being solid;

FIG. 7 is a partial longitudinal cross-section view of an alternative embodiment of the flywheel for which the flywheel is also solid;

FIG. 8 is a perspective view of the flywheel of FIG. 7;

DETAILED DESCRIPTION OF THE PREFERRED EMBODIMENTS

Figure 9:
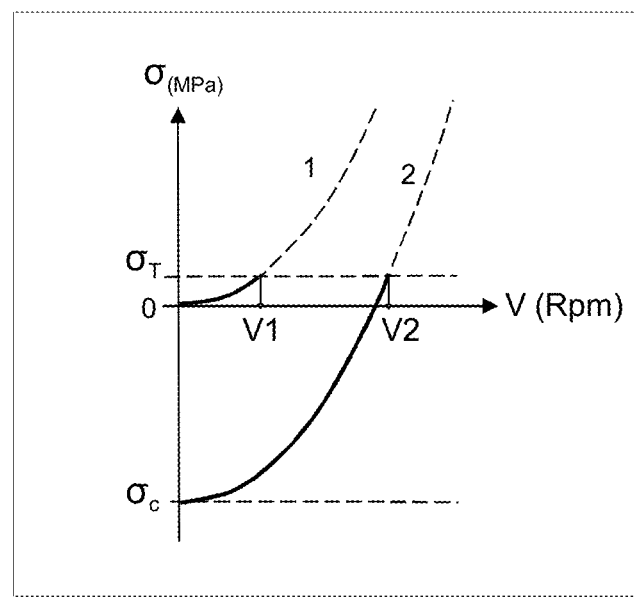
FIG. 9 is a curve of the variation of the stress in the body according to the peripheral speed of the flywheel.

The flywheel 1 of the invention shown in FIG. 1 has a body with a cylindrical shape of longitudinal axis X.

With regards to FIG. 2, the flywheel 1 is intended to be used in an energy storage device 2.

The energy storage device 2 comprises in a closed enclosure 3, the flywheel 1, an electric/generator motor 4 which is formed of a stator 40 and of a rotor 41, with the rotor 41 being mounted on the flywheel 1 and the stator 40 on a fixed shaft 5.

The shaft 52 is hollow in order to allow for the passage of the power cables 5A of the motor.

The shaft 52 carries at each one of its ends a ball bearing, respectively denoted 50 and 51.

In the example embodiment shown in the FIGS. 1 and 2, as in the alternatives of FIGS. 3 and 4, the flywheel 1 is hollow. The shaft 5 passes centrally through and according to its length, the longitudinal body of the flywheel.

The flywheel 1 is linked by its two opposite distal ends 10 and 11 to the shaft 5, and more exactly to the ball bearings 50 and 51, via connecting and fastening members 6. These connecting members 6 are for example two hubs associated respectively to the ends 10 and 11 of the flywheel, and cooperating with the two respective bearings 50 and 51.

As shall be seen hereinbelow, the two hubs 6 are integrated to the body of the flywheel 1, more particularly to the two end bases 10 and 11 of the cylindrical body of the flywheel.

Finally, a magnet 7 can be mounted on the shaft 5 creating on the lower hub 6 (in vertical mounted position of the flywheel), a force of attraction equal to the weight of the flywheel, in such a way as to cancel the axial force exerted on each bearing. This arrangement makes it possible to use bearings of small dimension that withstand high rotation speeds.

According to the invention, with regards to FIGS. 1 and 2, the body of the flywheel 1 comprises a mass 12 made of a material that makes it up, referred to as main material for the flywheel, for example made of concrete, and an enclosure 13 made of fibres 14 wound under tension and inducing compression forces on the mass 12.

The mass 12 made of concrete is manufactured by moulding. The enclosure 13 is obtained by winding under tension the fibres around the mass 12 in order to generate a compressive stress on said mass 12 when the latter is at rest, i.e. in the absence of rotation of the flywheel.

The material of the mass 12 is as such pre-stressed.

The tension applied to the fibres 14 during the winding is such that the stress exerted on the material of the mass 12 is at least equal to half of the maximum acceptable stress, with this maximum stress being less than the compression yield strength of the material that makes up the mass 12.

This yield stress of course depends on the material. For concrete, it will be appreciated that a concrete that has a high compression yield strength is used, and consequently that a concrete that is sufficiently loaded with cement is used.

The thickness (in the radial direction) of the concrete 12 will be much greater than the thickness of the enclosure 13 of fibres, with the latter thickness being sufficient to provide the appropriate stress.

In particular, the ratio e/D between the thickness "e" of the enclosure 13, and "D", the diameter of the cylindrical body including the thicknesses of the material of the mass 12 and of said enclosure 13, is greater than 1/100.

Preferably, the ratio e/D is less than 1/10.

When the flywheel is hollow, the mass 12 is annular. Advantageously, when the mass is made of concrete, it is suitable that the annular concrete thickness be at least half of the radius of the cylindrical body of the flywheel, in order to supply with this inexpensive material a maximum of mass for the purposes of maximised energy storage.

According to the invention, the fibres 14 are for example made of glass.

The winding is carried out at least on the cylindrical surface of the body of the flywheel.

The embodiment of FIG. 1 is a flywheel with a hollow body. The fibres are arranged over the entire cylindrical surface, except on the end bases 10 and 11.

The mass 12 is made of a single material, such as concrete. However, this material could be loaded with fibres.

In the alternative embodiment of FIG. 3, the hollow flywheel 1 similar to that of FIG. 1 further comprises, an additional material 15 that forms the inner wall of the cylindrical body. Advantageously, this material offers a resistance to the winding of the mass 12 by the fibres 14, which has for effect to further increase the compressive stress with regards to the main material 12 (concrete) that makes up the flywheel.

The material 15 is for example steel. In particular, the inner wall made of steel is formed by a duct 16 which was made integral with the concrete during the moulding of the concrete.

The alternative embodiment shown in FIGS. 4 and 5 corresponds to a hollow flywheel for which the end bases 10 and 11 (with only the base 10 visible) are covered by a filament winding 17 of fibres 14. The filament winding 17 forms on the cylindrical surface of the body a second enclosure that covers the first enclosure 13.

The bases 10 and 11 are also surrounded in order to make integral the flywheel with the connecting and fastening members 6. FIGS. 4 and 5 show one of the bases 10 only, as the other base is identical. A part 6, here forming a hub, is maintained on the hollow central portion of the end base 10 of the cylindrical body thanks to the filament winding 17.

The part 6 has a base 60 which is integrated to the filament winding 17. Only the orifice 61 of the hub is not covered with fibres (FIG. 5) in order to render it visible and accessible for the purposes of a later mounting of the flywheel on the shaft 5 and/or on the ball bearing 50 or 51.

In another embodiment for the mass 12 of the flywheel, the latter is not hollow but solid.

As such, FIG. 6 shows a solid flywheel comprising the concrete 12 and the enclosure 13 of fibres. In order to mount the flywheel in the storage device 1A, the flywheel 1 integrates a shaft 52 that extends beyond the end bases 10 and 11. The shaft 52 has the same function as the shaft 5 of FIG. 2. The shaft 52 is made integral with the body of the flywheel during the manufacturing by moulding of the mass 12, with the shaft 52 having been placed in the mould wherein the concrete was cast.

The alternative of FIGS. 7 and 8 also shows a solid body. This alternative will be preferred to that of FIG. 6 for which the risk exists over the course of time, of detaching the shaft 5 from the concrete.

In this alternative, the body 12 of the flywheel is homogeneous, i.e. it does not contain any material other than the main material that makes it up. In this way, the stress in the body remains substantially constant, while it increases near a heterogeneity such as a void or a rigid material. A solid and homogeneous flywheel can therefore be made to rotate faster than a hollow flywheel, or faster than a solid and heterogeneous flywheel, and therefore finally to store more energy therein.

In the example of the FIGS. 7 and 8, the mass body 12 on the end bases 10 and 11 (with only the base 10 visible) comprises a central boss 18 coming from moulding. This boss 18 receives via mutual cooperation a means of fastening 6 such as a shaft, with the base 60 of said means being added by mutual engagement around the boss. The means of fastening 6 can possibly be assembled by gluing. Said means 6 is made integral with the body of the flywheel thanks to the filament winding 17 that covers the end base 10.

In place of the boss 18, a central blind orifice (during moulding) can be arranged in the base of the cylinder in order to arrange the means of fastening. However, it is preferable to avoid any cavity in the concrete is order not to generate any additional stress.

As an example, a flywheel of the invention has the following characteristics:

The flywheel 1 is solid and cylindrical according to the configuration of FIGS. 7 and 8.
  The main material is made of concrete, with the concrete having a compression yield strength of 100 MPa.
  The diameter of the cylinder is 0.6 m.
  It has a length (height) of 2 m.
  Its mass is 1.4 t.
  The thickness of the enclosure 13 made of glass fibres is 12 mm.
  The mass of glass fibres is 0.11 t, which is much less than the mass of concrete.
  The glass fibres were wound according to an angle of 90° with respect to the longitudinal axis of the cylinder, and under a tension that leads to a stress of 1500 MPa.
  The pre-stress in the concrete (compression) is −50 MPa.
  The flywheel can rotate up to 7,700 rpm, a speed at which the pre-stress in the concrete becomes zero. The energy stored is then 23 MJ or 6.4 kWh.

According to an alternative implementation of the invention, the enclosure made of fibres is made before the moulding of the concrete (called to form the body of the flywheel). The pre-stress of the concrete is obtained during the moulding of the concrete inside the enclosure formed of fibres. For example, concrete in liquid state is subjected to a very high pressure (of about its compression yield strength), during the entire duration of the setting/curing of the concrete.

According to this alternative method:
  the fibres are wound on a mandrel with a minimum tension of winding, corresponding to a stress of about a few MPa, in order to prevent them from sliding or providing for their maintaining on the outer surface of the mandrel;
  the fibres are assembled with a resin (polymerisable or thermosetting or thermoplastic) in order to form a cylindrical enclosure;
  after hardening or polymerisation of the resin, the mandrel is removed;
  the tube delimited by the assembled fibres by the resin is placed in a mould;
  concrete is injected into the inside space of the tube at a high pressure, at a pressure that is able to create a tension in the fibres; the pressure is sufficiently high to take the natural shrinkage phenomenon of the concrete into account; this pressure of the concrete leads to a tension in the fibres, during moulding, which is greater than that required in service; the pressure is maintained for the time required for the concrete to set.

We can also use a concrete referred to as "expansive" which has the property of increasing in volume as it sets.

FIG. 9 describes a curve of the variation of the stress in the body according to the peripheral rotation speed of the flywheel.

The curve 1 refers to a flywheel made of conventional reinforced concrete, while the curve 2 refers to a flywheel made of sintered concrete according to the invention.

The horizontal dotted lines delimit the field of use of the concrete and correspondent respectively to:
  a stress value $\sigma_T$ which is the maximum acceptable traction, and of about a few MPa;
  a stress value $\sigma_C$ which is the maximum acceptable stress, and of about several tens of MPa.

Due to the centrifugal force, the stress "σ" increases as the square of the peripheral speed "V" of the flywheel: the curves σ=f(V) are therefore parabola.

For a flywheel body made of conventional concrete (curve 1), the initial stress (therefore when the peripheral speed is zero, i.e. V=0) is zero. The limit σT is reached for a low rotation speed (referenced as V1, of about a few dozen kilometers per hour). The quantity of energy stored in the concrete is therefore very low.

For a flywheel body made of concrete of the invention, combined with the pre-stressed fibres (curve 2), the compression applied by the winding of fibres makes for the initial stress to be close to the maximum acceptable stress. This has the consequence of reaching the limit σT for a high rotation speed (referenced as V2, of about a few hundred kilometers per hour). As such, the amount of energy stored in the concrete is very high.

Figure 10:
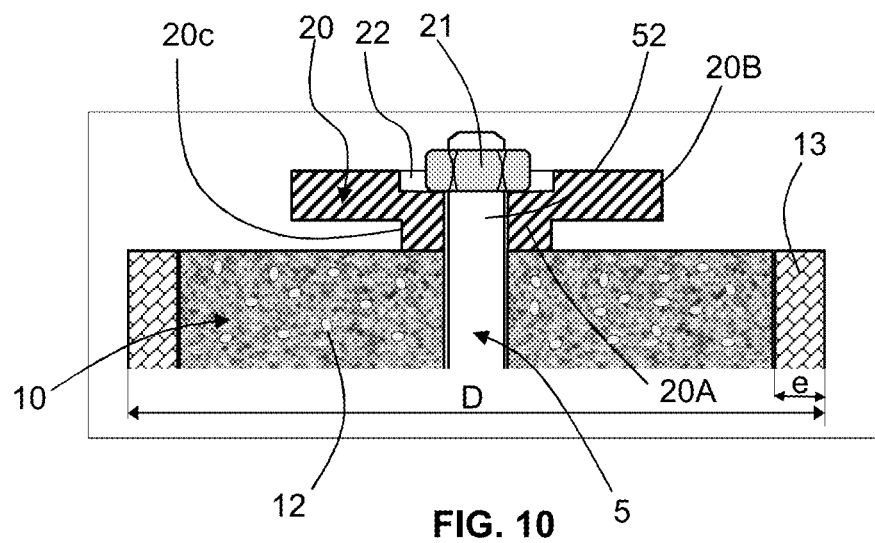
FIG. 10 is a partial diagrammatical cross-section view of the flywheel and of a means for fastening the central shaft of the latter.

FIG. 10 shows a detailed view of a mode for fastening the flywheel 10 of the FIG. 6 provides with a central shaft 5, on a structure. Only the upper end portion of the flywheel is shown, since the lower portion is identical.

The upper end 52 of the shaft 5 extends beyond the upper surface of the flywheel. An annular flange 20 is centred on the end portion 52, and placed against the upper face of the body 12 of the flywheel.

The lower portion of the flange, turned towards the flywheel, comprises a central annular portion 20A bearing against the body 12 and an outside annular portion 20B offset upwards (by moving away from the flywheel) by a shoulder 20C.

A nut 21 cooperates with the threaded end of the end portion 52 of the shaft, and bears against a central annular recess 22, provided on the upper face of the flange 20. This fastening alternative has several advantages. The tightening of the nuts 21 places the shaft 52, which is made of steel, in traction, and the body 12, which is made of concrete, in compression, which is the preferred working mode of each material. This induces a pre-stressing of the flywheel in the axial direction, which makes it very robust. In addition, the flange 20 facilitates the operations required for the operation of the flywheel: handling, balancing, magnetic suspension, fastening of bearings, axial fastening, etc.

Consequently, the invention, thanks to the main material of the mass of the flywheel, which is pre-stressed via the winding of the fibres under tension, makes it possible to provide a compression of said material such that it is possible to reach high rotation speeds before reaching the rupture of the material, which very advantageously makes it possible to store a large quantity of energy. The main material is in particular concrete, with a low cost price and is compression resistant.

The invention claimed is:

1. A flywheel intended for energy storage, comprising:
   a cylindrical mass body with a main material that has a compression resistance of at least 25 MPa,
   said body being surrounded on at least one portion of the outer surface thereof with fibers, the material that makes up the fibers having a tensile strength of at least 100 MPa,
   wherein the tension of winding the fibers around the body leads to the compression of said main material, and
   wherein the tension applied to the fibers is such that the stress exerted on the material of the mass body is at least equal to half of the maximum acceptable stress, said maximum stress being lower than the compression yield strength of the material that makes up the mass body, the material of the mass body thus being pre-stressed.

2. The flywheel according to claim 1, wherein the fibers are made from a material that has a Young's modulus less than 100 GPa.

3. The flywheel according to claim 1, wherein the fibers are glass fibers.

4. The flywheel as claimed in claim 1, wherein the fibers are wound on the cylindrical surface of the body according to a direction that is tangent to the body, by creating an angle with respect to the longitudinal axis of the body.

5. The flywheel according to claim 1, wherein the fibers are combined with a polymeric material, with the polymeric material having the form of a coating for the fibers and impregnating the fibers, with the fibers and the polymeric material forming an enclosure under tension covering at least one portion of the outer cylindrical surface of the body.

6. The flywheel according to claim 5, wherein the polymeric material is polyester of epoxy.

7. The flywheel as claimed in claim 1, wherein the body is hollow and comprises an additional material that covers the inner wall of the cylindrical body.

8. The flywheel according to claim 7, wherein the additional material that covers the inner wall of the cylindrical body is made of steel.

9. The flywheel according to claim 1, wherein the body of the flywheel is solid, and comprises a central shaft integrated to said body.

10. The flywheel according to claim 1, wherein the body of the flywheel is solid and homogeneous, and comprises a means of fastening on each distal end base.

11. An energy storage device comprising a protective enclosure, a motor that is reversible to operate as a generator and is housed in the enclosure, and a flywheel as claimed in claim 1, the flywheel being associated with the motor, driven by the motor, and guided in rotation by journal bearings.

12. A method for manufacturing a flywheel according to claim 1, comprising a step of manufacturing by molding, of the body made of a main material that has a compression resistance of at least 25 MPa, then, after hardening of said main material, a step of filament winding under tension of pre-stressed fibers.

13. The method according to claim 12, wherein the pre-stressed fibers are impregnated with a polymeric resin.

14. A method for manufacturing a flywheel according to claim 1, comprising the following steps:
    the fibers are wound on a mandrel with a minimum tension of winding, in order to prevent them from sliding and/or providing for their maintaining on the outer surface of the mandrel;
    the fibers are assembled by a resin in order to form a cylindrical enclosure;
    the mandrel is removed;
    the tube delimited by the fibers assembled by the resin is placed in a mold;
    concrete is injected into the inside space of the tube at a high pressure, at a pressure value that is able to create a tension in the fibers, with the pressure being maintained for the time required for the concrete to set.

15. A device for fastening a flywheel according to claim 1, where said flywheel includes a central shaft of which at least one end protrudes from the surface of the flywheel, comprising:
    at least one annular flange, centered on the end portion of the shaft and pressed against the face of the body of the flywheel; and
    at least one means for tightening the flange on the flywheel able to cooperate with the end of the shaft.

16. The flywheel according to claim 1, wherein the main material is concrete.

17. The flywheel according to claim 2, wherein the material having a Young's modulus less than 100 GPa also has a density less than 4.

18. The flywheel according to claim 17, wherein the material is glass.

19. The flywheel according to claim 4, wherein the angle with respect to the longitudinal axis of the body is between 10 and 90°.

20. The flywheel according to claim 19, wherein the angle with respect to the longitudinal axis of the body is an angle of or close to 90° with respect to the longitudinal axis of the body.

* * * * *